US012276409B1

(12) United States Patent
Rashidi Doust

(10) Patent No.: US 12,276,409 B1
(45) Date of Patent: Apr. 15, 2025

(54) MINI LED LIGHT FIXTURE

(71) Applicant: Elite Lighting, Commerce, CA (US)

(72) Inventor: Hamid Rashidi Doust, Beverly Hills, CA (US)

( * ) Notice: Subject to any disclaimer, the term of this patent is extended or adjusted under 35 U.S.C. 154(b) by 0 days.

(21) Appl. No.: 18/746,021

(22) Filed: Jun. 17, 2024

(51) Int. Cl.
*F21V 21/04* (2006.01)
*F21V 15/01* (2006.01)
*F21V 17/10* (2006.01)
*F21V 21/34* (2006.01)
*F21V 29/76* (2015.01)

(52) U.S. Cl.
CPC .............. *F21V 21/04* (2013.01); *F21V 15/01* (2013.01); *F21V 17/105* (2013.01); *F21V 21/34* (2013.01); *F21V 29/763* (2015.01)

(58) Field of Classification Search
CPC ........ F21V 21/04; F21V 15/01; F21V 17/105; F21V 21/34; F21V 29/763
See application file for complete search history.

(56) References Cited

U.S. PATENT DOCUMENTS

| | | | | |
|---|---|---|---|---|
| 6,474,846 | B1 * | 11/2002 | Kelmelis | F21S 8/026 248/231.91 |
| 10,151,461 | B2 | 12/2018 | Petzold | |
| 10,697,615 | B1 * | 6/2020 | Rashidi Doust | F21V 21/15 |
| 11,255,497 | B2 * | 2/2022 | Danesh | H02G 3/08 |
| 2015/0085476 | A1 * | 3/2015 | Mandy | F21V 29/773 362/147 |
| 2015/0252988 | A1 * | 9/2015 | Rashidi Doust | F21V 29/70 362/373 |

* cited by examiner

*Primary Examiner* — Evan P Dzierzynski
(74) *Attorney, Agent, or Firm* — Payam Moradian

(57) ABSTRACT

Provided is a light fixture comprising: a body with a cavity, the body having a cavity and an opening on a bottom of the cavity; tracks on opposite sides of the body on outside of the body, the tracks configured to attach to bar hangers; a source of light inside of the cavity; reflector inside of the cavity below the source of light; and a plate below the optics, the plate secured to the body to close the opening of the cavity, the plate further having a central opening for passage of light from inside to outside of the cavity.

8 Claims, 12 Drawing Sheets

MINI LED LIGHT FIXTURE

BACKGROUND SECTION OF THE INVENTION

Lighting Fixtures with small openings can be hidden in a ceiling, providing a source of light without the body of the light source being visible to a suer. There is a need in the art for such light sources that are thin and can be hidden in the ceiling.

SUMMARY SECTION OF THE INVENTION

Provided is a light fixture comprising: a body with a cavity, the body having a cavity and an opening on a bottom of the cavity; tracks on opposite sides of the body on outside of the body, the tracks configured to attach to bar hangers; a source of light inside of the cavity; reflector inside of the cavity below the source of light; and a plate below the optics, the plate secured to the body to close the opening of the cavity, the plate further having a central opening for passage of light from inside to outside of the cavity. The body can be a cube or a cuboid with less than two inches in height. The plate can be made from steel. The body can be made from aluminum and the plate can be from steel. A trim can be attached to below the plate. The reflector can include a plurality of magnets. The sources of light can be attached to below a top of the housing, inside of the cavity. A bracket can be placed around the reflector, the bracket attached to a top of the plate.

Provided is a light fixture comprising: a body with a cavity, the body having a cavity and an opening on a bottom of the cavity; a source of light inside of the cavity; a reflector inside of the cavity below the source of light; and a plate below the optics, the plate secured to the body to close the opening of the cavity, the plate further having a central opening for passage of light from inside to outside of the cavity; and a trim attached to below the plate. The trim can be attached to the plate with magnets. The trim can comprise a plurality of magnets with exposed surfaces for attachment to the plate. The plate can be made from steel. The sources of light can be attached to below a top of the housing, inside of the cavity. The fixture can include a reflector below the sources of light, and a bracket around the reflector, the bracket attached to a top of the plate.

Provided is a light fixture comprising: a body with a cavity, the body having a cavity and an opening on a bottom of the cavity, the body a cuboid with a height of less than 2 inches and a length of less 0.5 meters; T-tracks on opposite sides of the body on outside of the body, the tracks configured to attach to bar hangers; a source of light inside of the cavity; a reflector inside of the cavity below the source of light; and a plate below the optics, the plate secured to the body to close the opening of the cavity, the plate further having a central opening for passage of light from inside to outside of the cavity and a trim with magnets attached to the plate on a bottom of the plate. The light fixture can include a holder for attaching the sources of light below a top of the housing, inside of the cavity. The light fixture can include a bracket inside of the cavity around the reflector, the bracket keeping the reflector in place. The bracket can be attached to a top of the plate. The plate can be made from steel. The body can be made from aluminum and the plate is from steel

DETAILED DESCRIPTION OF THE INVENTION

Figure 1:
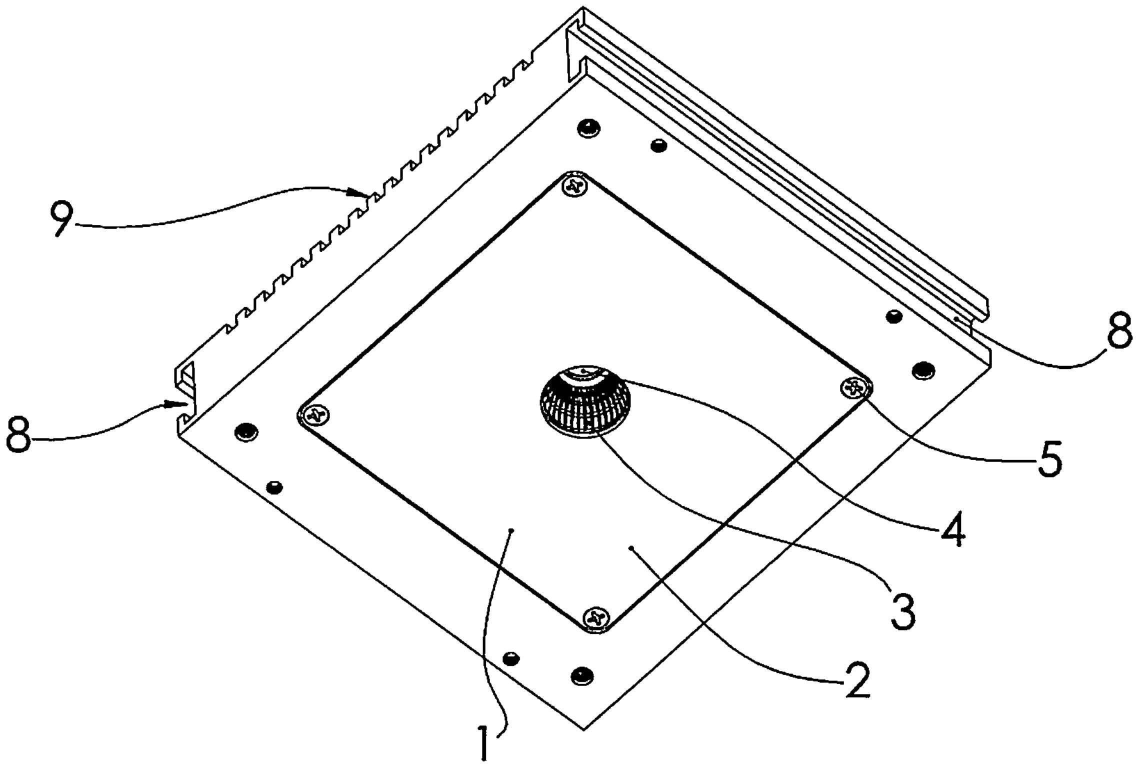
FIG. 1 illustrates a bottom perspective view of the Mini LED Light Fixture.

FIG. 1 illustrates a bottom perspective view of the Mini LED Light Fixture. Illustrated in this view are body 1, plate 2, reflector 3 placed in between plate 2 and top of body 1, LED light source 4 placed on top of reflector 4, fasteners 5, for attaching the plate 2 to body 1. Body 1 can be made of aluminum and act a heat skink. Body 1 can have fins on top to increase the surface area and help in dissipating heat.

Body 1 can have tracks 8 on opposite sides configured for attachment to bar hangers. The tracks are configured to slidably receive bar hangers.

Figure 2:
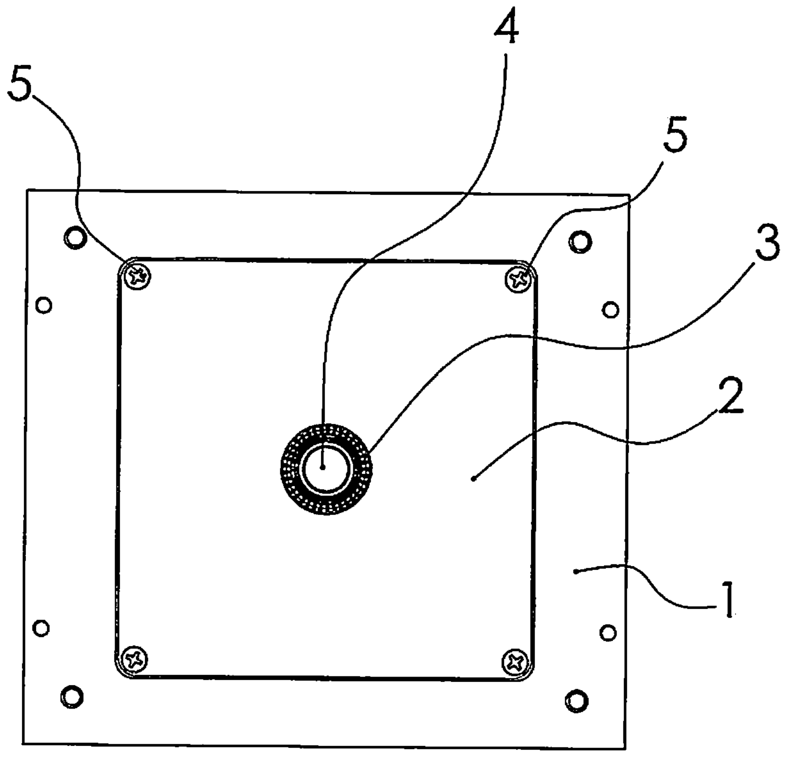
FIG. 2 illustrates a bottom plan view of the Mini LED Light Fixture.

FIG. 2 illustrates a bottom plan view of Body 1. Illustrated in this view are body 1, plate 2, LED light source 4, reflector 3, and fastener 5. Body 1 can have a height of one inch to two-inches. Body 1 can be square (cuboid), with each side having a length of 3 inches to 12 inches.

Figure 3:
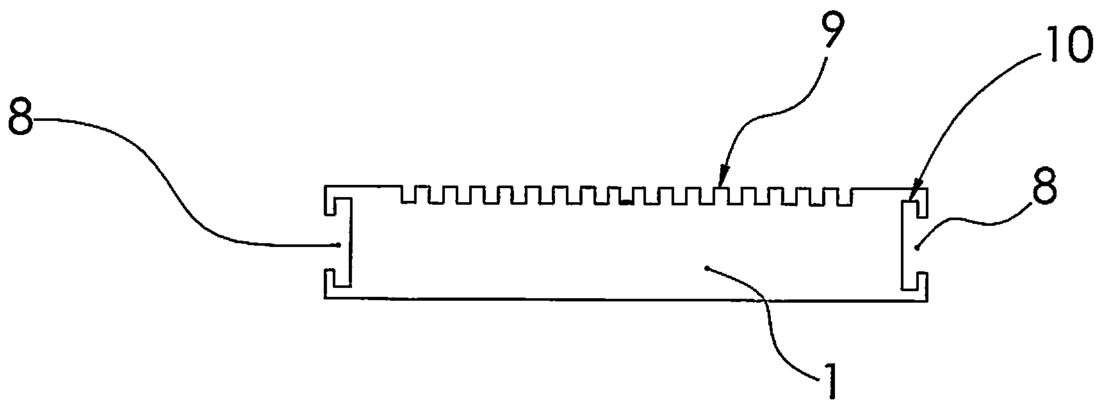
FIG. 3 illustrates a right-side view of the Mini LED Light Fixture.
Figure 4:
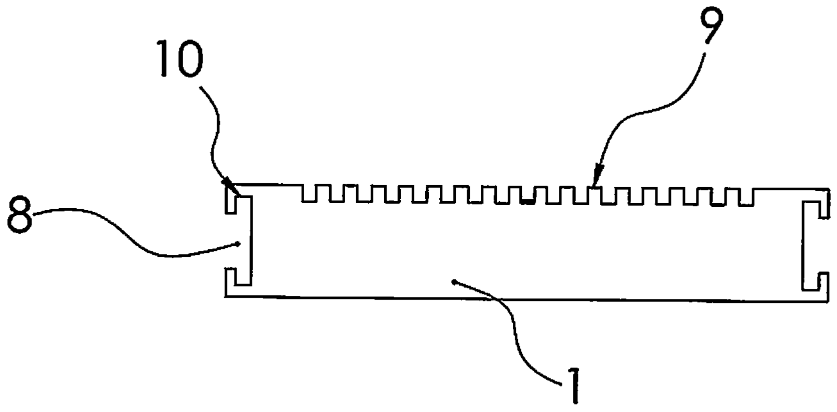
FIG. 4 illustrates a left side view of the Mini LED Light Fixture.

FIGS. 3 and 4 illustrate opposite side views of the body 1. Illustrated in this view is body 1 with fins 9. Also illustrated are T-tracks 8 formed by arms 10 extending from body 1. T-tracks 8 are configured to receive a bar hanger 25. Body 1 can be made from aluminum. Plate 2 can be made from steel.

Figure 5:
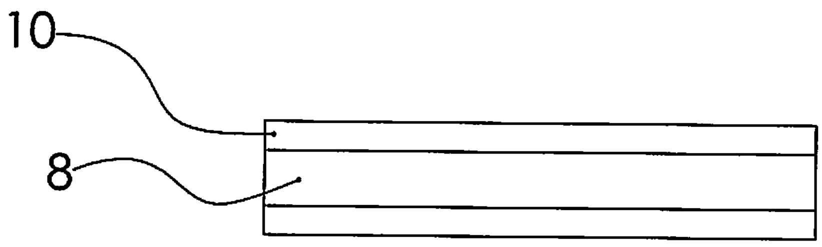
FIG. 5 illustrates a front side view of the Mini LED Light Fixture.
Figure 6:
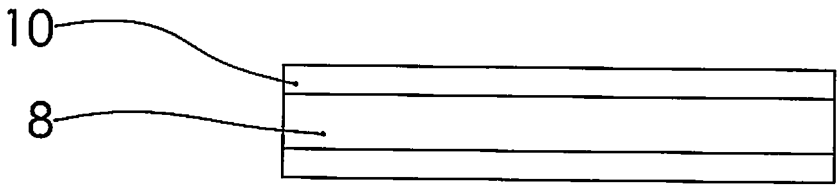
FIG. 6 illustrates a rear side view of the Mini LED Light Fixture.

FIGS. 5 and 6 illustrate opposite side views of the body 1. Illustrated in this view are slots 8 and arms 10.

Figure 7:
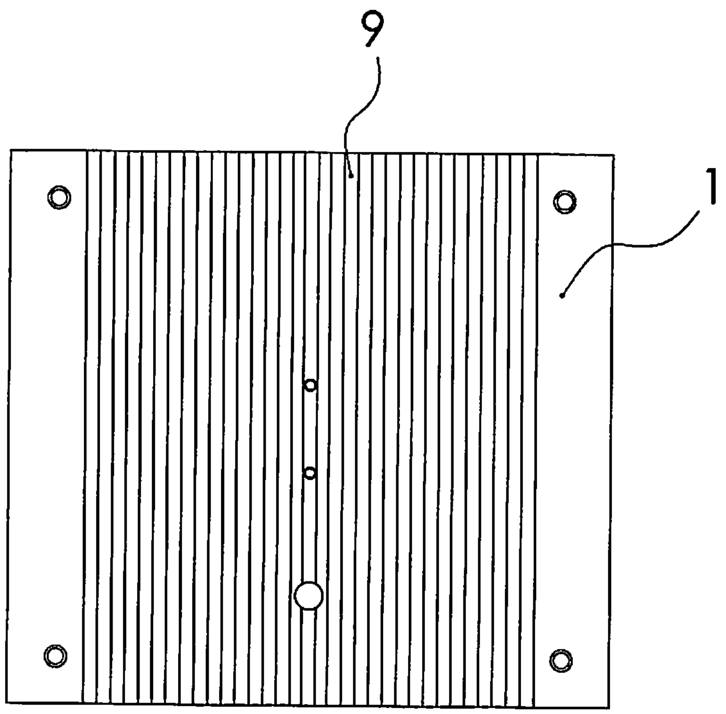
FIG. 7 illustrates a top plan view of the Mini LED Light Fixture.
Figure 8:
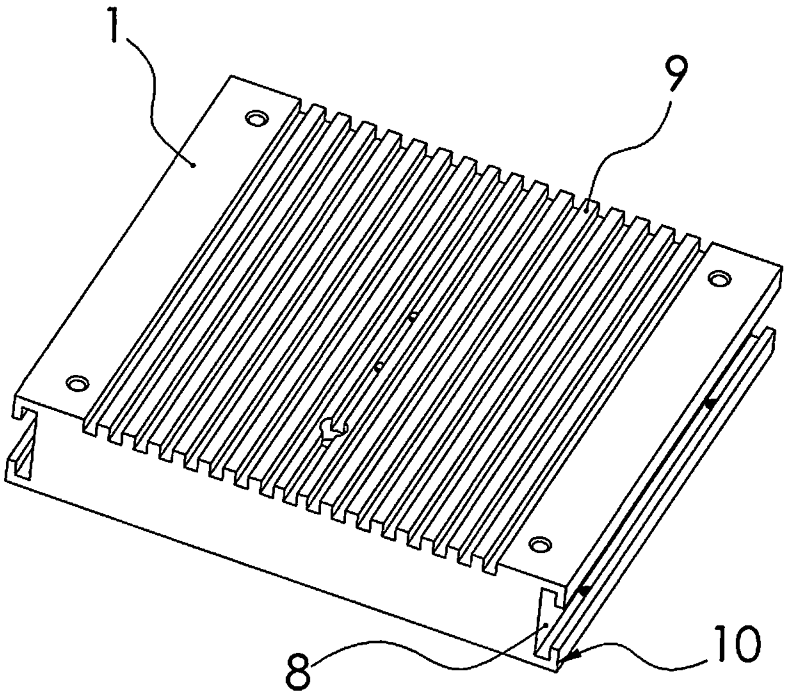
FIG. 8 illustrates a top plan view of the Mini LED Light Fixture.

FIGS. 7 and 8 illustrate a top side of the body 1. Illustrated in this view are body 1 and fins 9.

Figure 9:
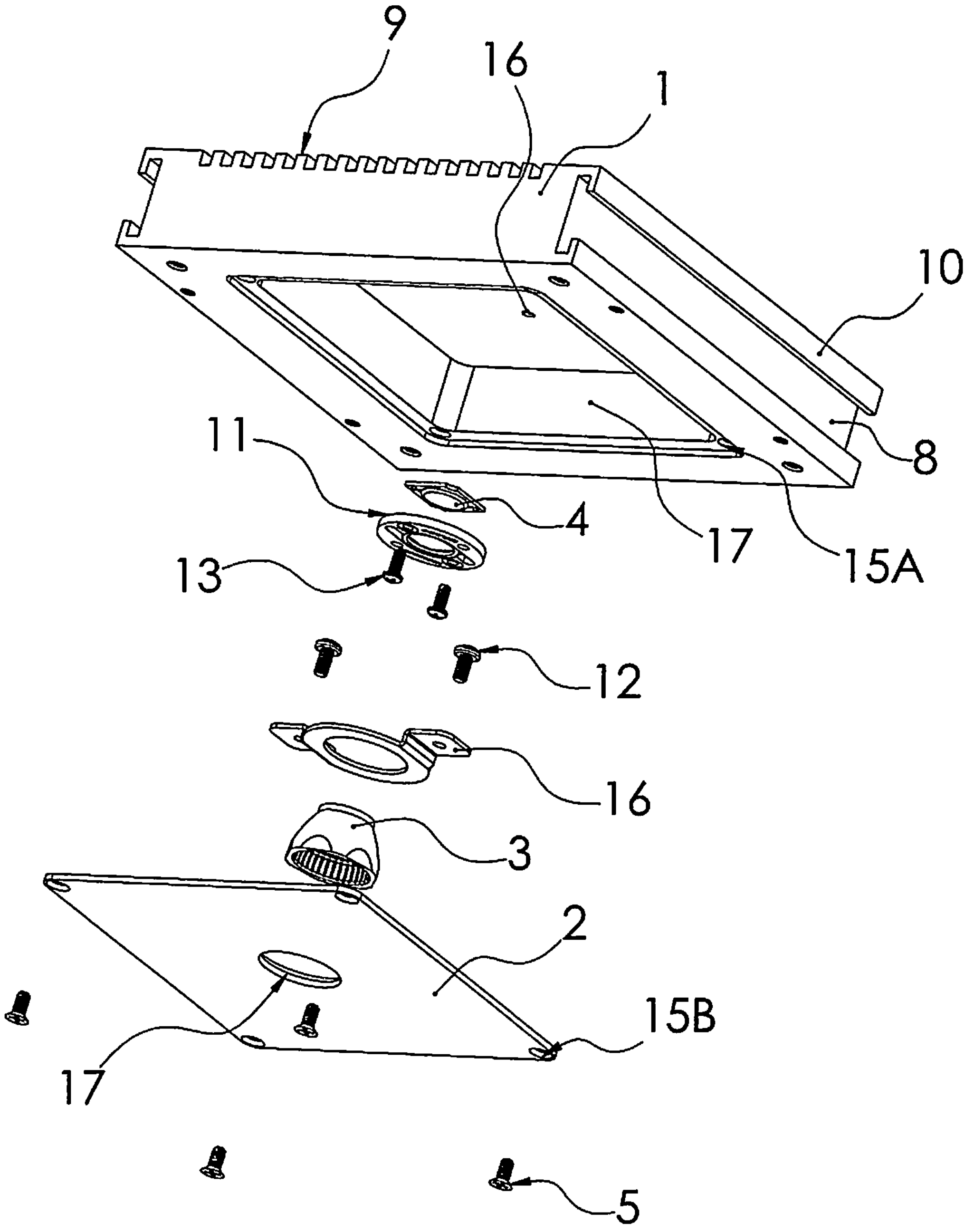
FIG. 9 illustrates an exploded view of the Mini Led Light Fixture.

FIG. 9 illustrates an exploded view of the mini Led Light Fixture. Illustrated in the view are LED light source 4 and holder 11. Holder 11 sits on bottom of LED 4 and attaches the LED light source 4 to inside-top of the body 1 with fasteners 13. Copper wires carrying power are attached to holder 11.

Bracket 16 has a circular opening that is complementary to reflector 3. Bracket 16 goes around reflector 3 and secures the reflector 3 to plate 2 with fasteners 12. Plate 2 can have a welded steel layer on top for receiving the fasteners 12. Holder 11 sits on top of bracket 16, and light passes through the circular opening of bracket 16. Plate 2 has a complementary circular opening 17 in its center for passage of light. Plate 2 is attached to body 1 with complementary fastener openings 15A and 15B on the corners of plate 2.

LED light source is placed on top of cavity 17, held in place by holder 11, which rests on bracket 16. Bracket 16, and reflector 3 are placed below light source 3, in configuration that light from LED light source 4 is reflected with reflector 3. Light leaves cavity 17 of the body though opening 17 of plate 2. As illustrated, plate 2 is a planar square, with a circular opening (can be less than one inch in diameter) in the middle and round corners with openings 15B.

Figure 10:
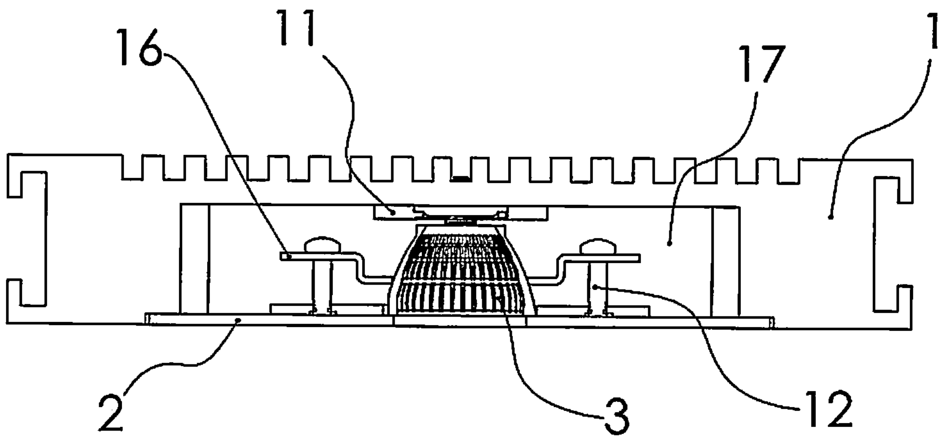
FIG. 10 illustrates a cut-off section view of the Mini LED light.
Figure 11:
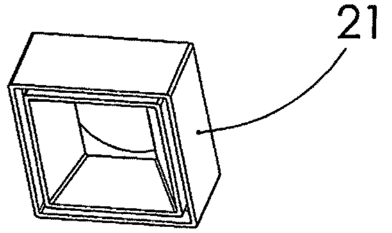
FIG. 11 illustrates a square trim.
Figure 12:
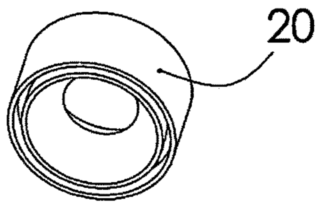
FIG. 12 illustrates a circular trim.
Figure 13:
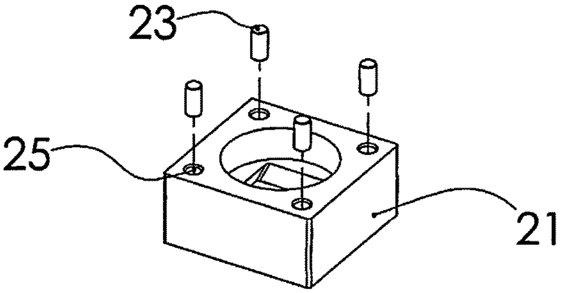
FIG. 13 illustrates a square trim.
Figure 14:
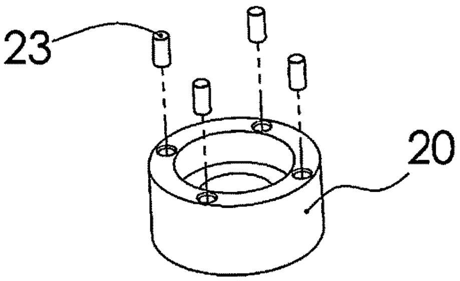
FIG. 14 illustrates a circular trim.
Figure 15:
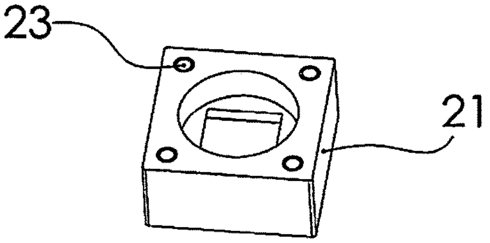
FIG. 15 illustrates a square trim.
Figure 16:
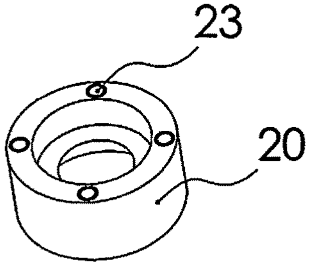
FIG. 16 illustrates a circular trim.

FIG. 10 is a cut-off section view of the Mini LED light. Illustrated in this view is reflector 3 attached to plate 2 (welded layer on top of plate 2) with bracket 16 and fastener 12. Holder 11 is attached to the top of cavity 17 of body 1.

FIGS. 11 to 16 illustrate trims that are attached to plate 2 with magnets 23. Plate 2 can be made from steel for attachment to magnet 23. Body 1 can be made from aluminum or steel. The circular trim 20 and the square trim 21, can have a plurality of openings 25, in the shape of cylinders. As illustrated, four openings 25 are present. Magnet 23 is placed inside of opening 25. The magnet attached to bottom plate 2 outside of body 1.

Figure 17:
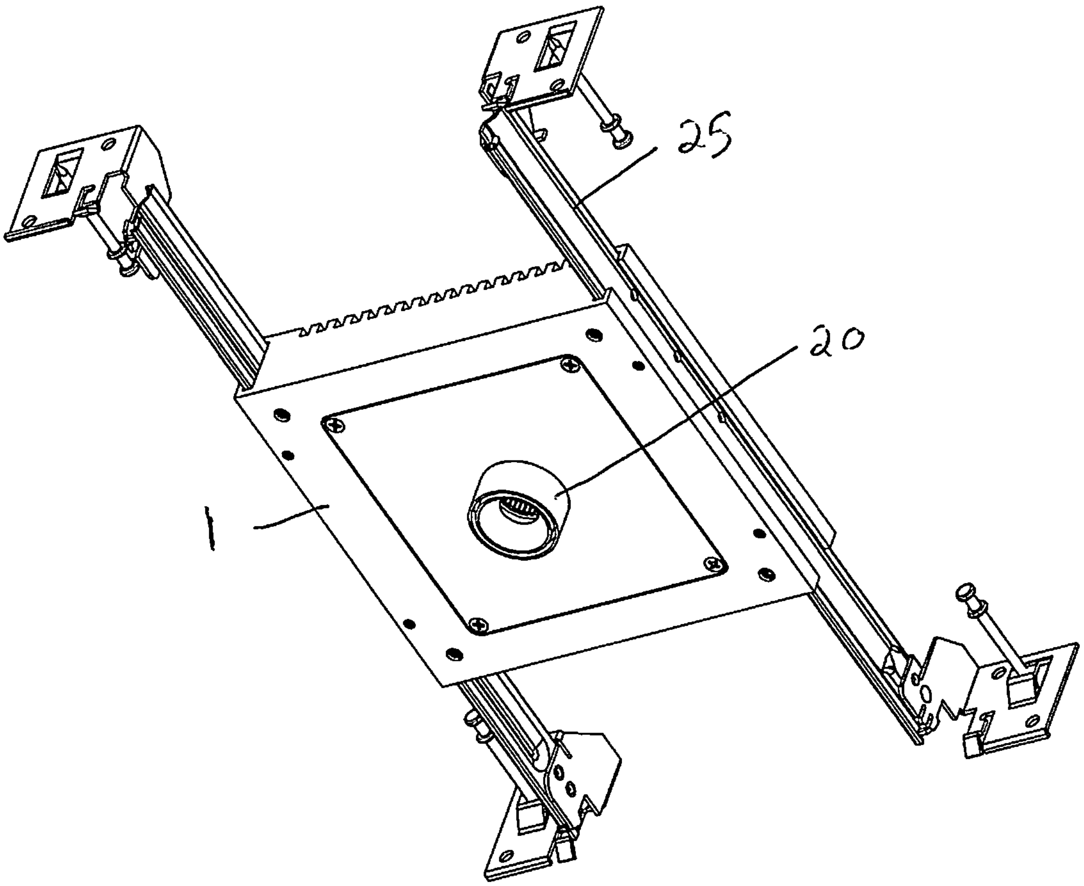
FIG. 17 illustrates Mini LED Light Fixture attached to bar hangers.

FIG. 17 illustrates body 1 attached to bar hangers 25. Bar hangers 25 can be attached to a support structure, such as ceiling joists or wall studs. Trim 20 is attached below plate 2 with magnets 23.

What is claimed is:

1. A Light Fixture comprising:

a) a one-piece fabricated body with a cavity, the one-piece fabricated body having a cavity and an opening on a bottom of the cavity, the body made from aluminum and having fins on top, wherein the one-piece fabricated is a cube or a cuboid with less than two inches in height; tracks on opposite sides of the one-piece fabricated body on outside of the one-piece fabricated body, the tracks configured to attach to bar hangers;

b) a source of light inside of the cavity;

c) reflector inside of the cavity below the source of light; and d) a plate made from steel below the reflector, the plate secured to the one-piece fabricated body to close the opening of the cavity, the plate further having a central opening for passage of light from inside to outside of the cavity.

2. The light fixture of claim 1, further comprising a trim attached to below the plate.

3. The light fixture of claim 2, wherein the reflector comprises a plurality of magnets.

4. The light fixture of claim 1, wherein the sources of light are attached to below a top of the housing, inside of the cavity.

5. The light fixture of claim 4, further comprising a bracket around the reflector, the bracket attached to a top of the plate.

6. The light fixture of claim 4, further comprising a reflector below the sources of light, and a bracket around the reflector, the bracket attached to a top of the plate.

7. The light fixture of claim 1, wherein the sources of light are attached to below a top of the housing, inside of the cavity.

8. A light fixture comprising:

a) a one-piece fabricated body with a cavity, the body having a cavity and an opening on a bottom of the cavity, the body made from aluminum and having fins on top, wherein the body is a cube or a cuboid with less than two inches in height;

b) a source of light inside of the cavity;

c) a reflector inside of the cavity below the source of light;

d) a plate made from steel below the reflector, the plate secured to the one-piece fabricated body to close the opening of the cavity, the plate further having a central opening for passage of light from inside to outside of the cavity; and e) a trim attached to below the plate with magnets, wherein the trim comprises a plurality of magnets with exposed surfaces for attachment to the plate.

* * * * *